June 24, 1930.  L. M. WOOLSON  1,768,185
HYDROCARBON MOTOR
Filed Dec. 9, 1920   2 Sheets-Sheet 1

Inventor
Lionel M. Woolson,
By Milton Tibbetts
Attorney

June 24, 1930.　　　　L. M. WOOLSON　　　　1,768,185
HYDROCARBON MOTOR
Filed Dec. 9, 1920　　　2 Sheets-Sheet 2
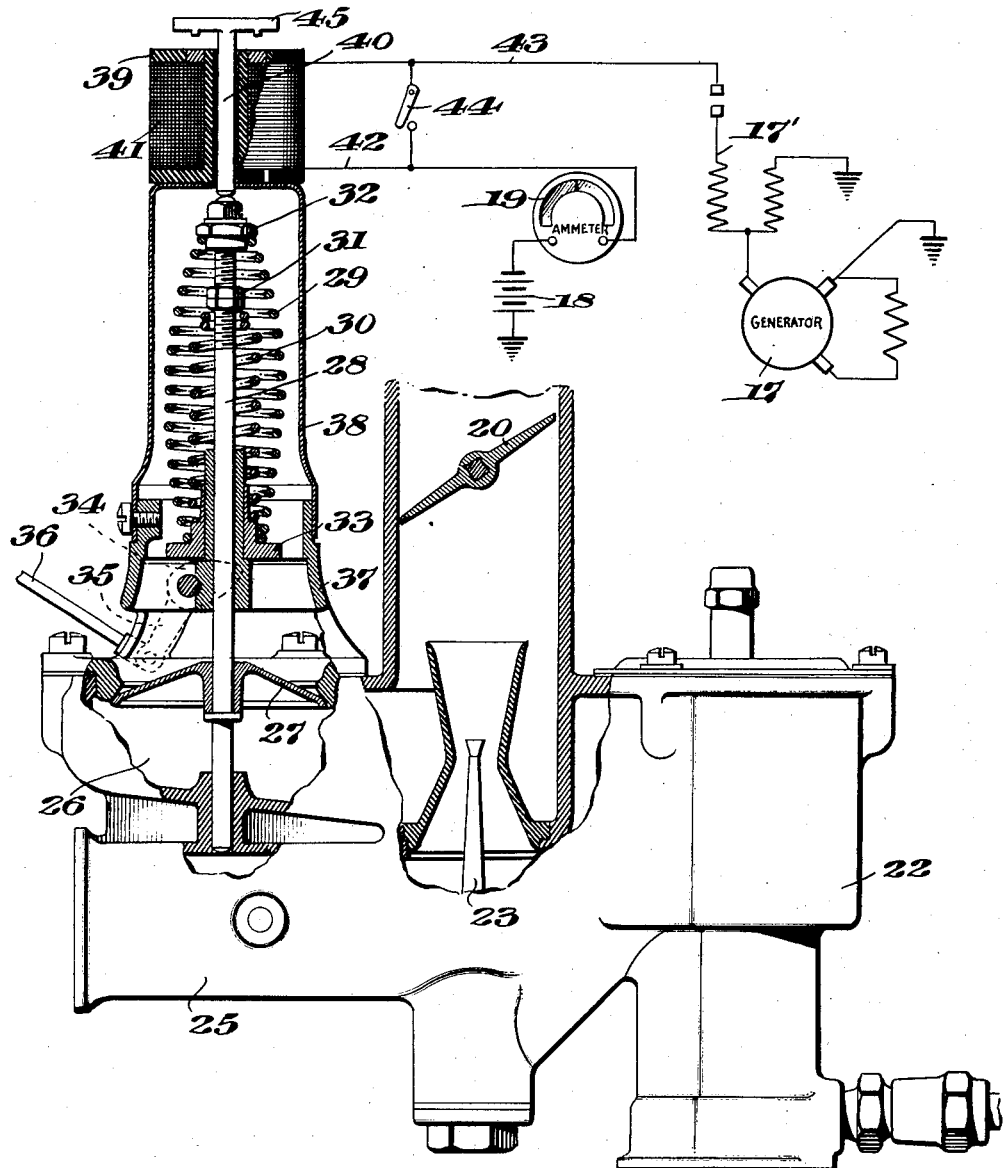
Fig. 3.
Inventor
Lionel M. Woolson
By 
Attorney Patented June 24, 1930

1,768,185

UNITED STATES PATENT OFFICE

LIONEL M. WOOLSON, OF DETROIT, MICHIGAN, ASSIGNOR TO PACKARD MOTOR CAR COMPANY, OF DETROIT, MICHIGAN, A CORPORATION OF MICHIGAN

HYDROCARBON MOTOR

Application filed December 9, 1920. Serial No. 429,585.

This invention relates to hydrocarbon motors and particularly to the mixture forming and supplying means therefor.

Most carburetors or mixture forming and supplying devices of today are designed for the purpose of giving a substantially uniform mixture of liquid fuel and air throughout the range of suction of the motor. Most of them have adjusting means of one kind or another for varying the proportions of air and fuel but as a rule these various means affect the mixture either throughout the entire range of action of the carburetor or at one end or the other of such range.

It is well known that a hydrocarbon motor requires a fairly rich mixture for idling and for the lower "pick-up" speeds. Also at the extremely high speeds of the motor, if maximum speed and power are to be obtained, a theoretically correct mixture must be supplied, that is, a mixture of about fifteen or sixteen parts of air to one of liquid fuel. Therefore, motors that are to idle nicely and at the same time are to develop their greatest power at high speeds must have mixture forming means that will produce these mixtures as required.

In motor vehicles in which the greater number of hydrocarbon motors are used, the greater amount of operation of the motor is done at points in between these two extremes, or in other words, motor vehicles are today driven most of the time between 15 and 30 miles per hour and over substantially level roads. This may be called the "cruising range" and under these conditions very little power is required to operate the vehicle. Considerable power may be required, however, to accelerate the vehicle suddenly, or to climb a grade, etc. It is one of the objects of this invention to automatically weaken the mixture of a hydrocarbon motor in this "cruising range" without affecting the operation of the mixture forming means for idling or for the higher speeds, or when considerable power is required.

Other objects of the invention will appear from the following description taken in connection with the drawings, which form a part of this specification, and in which:

Fig. 3 is an enlarged view of the carburetor shown in Fig. 1 with a diagrammatic showing of the wiring.

Figure 1:
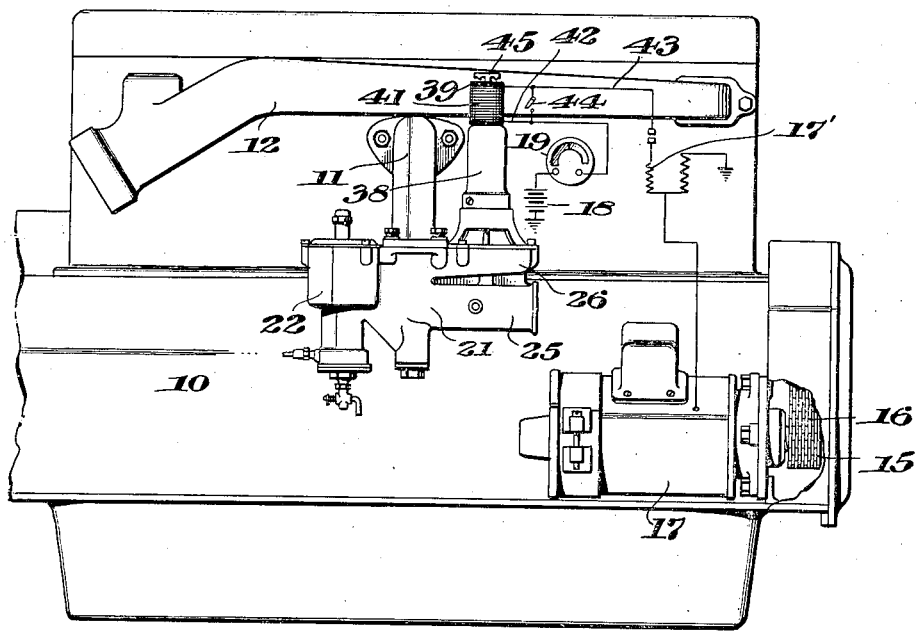
Fig. 1 is a side elevation of a hydrocarbon motor built in accordance with this invention, some of the parts being shown somewhat diagrammatically.
Figure 2:
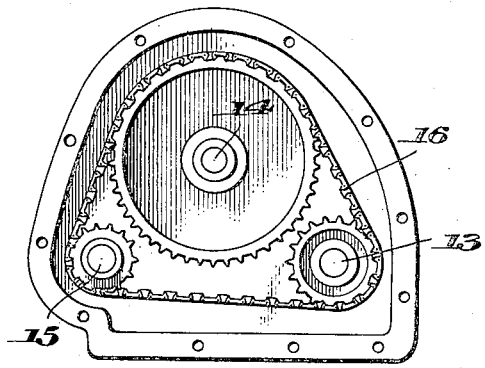
Fig. 2 is an elevation of the front end of the motor with the gear cover removed.

Referring to the drawings, 10 is a hydrocarbon motor having an intake pipe 11 and an exhaust pipe 12. In Fig. 2 the front end of the crank shaft 13 is shown and 14 is the cam shaft and 15 the generator shaft. There are gears on these three shafts and a chain 16 connects them so that the crank shaft drives both the cam shaft and the generator shaft.

A generator 17 is shown driven by the shaft 15 and a battery 18 is illustrated diagrammatically with a suitable circuit connecting it with the generator and a suitable ammeter 19 in the line. A reverse current relay 17' prevents discharge of the battery through the generator.

In the intake pipe 11 is a throttle valve 20, shown in Fig. 3 and at the lower end of the pipe a carburetor 21 is mounted. This carburetor has the usual float chamber 22, which supplies a fuel nozzle 23 arranged in a Venturi tube 24. The Venturi tube is supplied with air from a main air intake 25, and an auxiliary air intake 26 supplies additional air above the Venturi tube. The auxiliary air intake 26 is controlled by a spring closed valve 27, the stem 28 of the valve being surrounded by springs 29 and 30. The upper ends of these springs rest against adjustable stops 31 and 32 respectively, and the lower ends rest upon a slidable abutment 33 which may be manually adjusted by a cam 34 as by the arm 35 and rod 36. The manual adjustment of these springs therefore controls the spring action of the valve 27.

Above the valve 27 is a spider 37 which supports a cover 38 for the valve springs and upon this cover is a solenoid 39 which has a plunger 40 contacting with the upper end of the valve stem 28. The winding 41 of the solenoid is connected on one side through a conductor 42 with the battery 18 and on the other side through a conductor 43 with the generator 17. A switch 44 may be mounted to short circuit the solenoid should that be desirable at any time.

The plunger 40 has a very short range of action due to its upper end 45 coming in contact with the upper end of the solenoid itself. Thus when the solenoid is energized the plunger 40 will depress the valve stem 28 a short distance, though not far enough to fully open the valve 27.

It will be understood that the air valve 27 is the mixture controlling means of the carburetor. By moving the cam 34 the springs 29 and 30 may be so adjusted that the valve 27 will be very lightly seated. This is the correct adjustment for the valve for idling and for the greatest power at high speeds. At intermediate speeds, however, it is desirable to change the adjustment of the valve springs so that the valve will open more readily and supply additional air, but if this is done by the manual adjustment it is difficult to readjust the valve springs for idling. This situation therefore is taken care of by the solenoid plunger and the connection of the solenoid to the motor generator as above described.

The motor generator, in most vehicles, becomes effective at a speed of about 9 or 12 miles per hour, depending upon the setting of the relay 17', which is about the desirable speed for weakening the carburetor mixture. Thus, when the car reaches this speed the generator will energize the solenoid 39 and its plunger 40 will be pulled down against the end of the valve stem 28. When the car is operating over level or nearly level road so that little power is required, this will open the valve 27 and thus weaken the mixture at its source below the throttle valve 20. Of course the plunger 40 will remain in that position at all the higher speeds, but at the higher speeds the suction of the motor will be so great that the valve 27 will be opened even wider than the plunger 40 opens it, i. e., operating range or opening movement of the valve 27 is greater than the movement or range of operation of the plunger 40. At the same time the suction on the liquid fuel is greater and the valve spring adjustment is such that substantially the correct mixture is then supplied to the motor and of course this is done entirely independently of the position of the plunger 40, because of the limited movement of said plunger.

Thus whenever the motor suction is great enough to overcome the valve spring, valve 27 will be opened independently of the operation of the solenoid. This takes place not only at speeds above the cruising range speed as explained above, but also when the throttle valve is opened wide to obtain relatively high power, except at very low speeds. When the car is climbing a hill, or when it is desired to accelerate suddenly, for example, and the throttle is opened to the full open or nearly full open position the total amount of air passing through the carburetor is so great even at low speeds (except extremely low speeds) that the valve 27 is opened wider than the plunger 40 opens it. Therefore, at idling speeds, at speeds above the cruising range, and with large throttle openings, the carburetor operates independently of the solenoid and supplies correctly proportioned mixtures for full power to the motor under these conditions. The action of the carburetor is modified by the solenoid, however, over the cruising speed range when the throttle opening is relatively small, so that the mixture is leaned when the vehicle is driven at speeds within the cruising range over level or nearly level roads and little power is required which is the normal operating condition for automotive vehicles.

Other forms of the invention may be made without departing from the spirit or scope hereof.

Having thus described my invention what I claim and desire to secure by Letters Patent is:

1. A carburetor for a hydrocarbon motor comprising an auxiliary air supply duct, a valve controlling said duct, resilient means for controlling said valve, means operable at a distance from said resilient means for adjusting the control of the latter, and means including a plunger actuated when the motor reaches the lowest cruising range speed for controlling said valve, said resilient means being effective to yieldingly resist movement of the valve induced by the suction of the motor when the latter reaches a speed greater than the highest cruising range speed.

2. In a hydrocarbon motor, the combination with the motor generator and with means for forming and supplying a combustible mixture of liquid fuel and air, of valve means actuated by the motor generator for weakening the mixture along a certain intermediate range of motor speed without affecting the mixture above and below said range.

3. In a hydrocarbon motor, the combination with a carburetor having a spring closed valve, and the generator operated by the motor, of means actuated by the generator for opening said valve a predetermined amount, said valve being adapted to be opened a further amount by the suction of the motor.

4. In a hydrocarbon motor, the combination with a carburetor having a spring closed valve, and the generator operated by the motor, of means actuated by the generator for holding said valve open during a portion only of the intermediate range of action of the carburetor.

5. In a hydrocarbon motor, the combination with a carburetor having a movable air supply valve, a spring adapted to close said valve, and a device for opening said valve a predetermined amount, the tension of said spring being less than the maximum suction of the motor whereby said valve is adapted to be opened a greater amount by the suction of the motor.

6. In a hydrocarbon motor, the combination with mixture forming and supplying means and a valve for controlling the quantity of mixture passing to the motor, of means for controlling the quality of the mixture including an auxiliary air intake, a movable valve for said intake, a plunger for moving said valve a predetermined amount, and resilient means for maintaining said valve closed at idling speed, said second named means being actuated when the motor operates at a predetermined speed for weakening said mixture below said throttle valve and operating to slightly enrich said mixture when the throttle valve is wide open.

7. In a hydrocarbon motor, the combination with mixture forming and supplying means and a throttle valve for controlling the quantity of mixture passing to the motor, of a motor generator, an auxiliary air duct for said means, a valve in said duct, and means actuated by said motor generator for opening the valve a predetermined amount, said valve being adapted to be opened a further amount by the suction of the motor.

8. In a hydrocarbon motor, the combination with the motor intake pipe and the throttle valve, of means for supplying rich mixtures for idling and full open throttle running and a lean mixture for cruising range speeds including an auxiliary air intake, a valve in said auxiliary intake, means including a plunger for positively moving said valve, said valve also being adapted to be moved a further amount by the suction of the motor, and a spring for resisting movement of the plunger.

9. In a hydrocarbon motor, the combination with the motor intake pipe, of means for supplying rich mixtures for idling and full open throttle running and a lean mixture for cruising range speeds by varying the quantity of air supplied including an auxiliary air intake, a movable valve in said auxiliary air intake, means including a plunger for actuating said valve as the motor reaches the lowest cruising range speed, and a spring for resisting movement of the plunger and valve, said valve being actuated by suction of the motor as the latter reaches a speed in excess of the highest cruising range speed.

10. In a hydrocarbon motor, the combination with a carburetor having a spring closed valve, of slidable means for adjusting the spring tension in the valve, and automatic means operable independently of said slidable means for opening said valve a predetermined amount, said valve being actuated through the remainder of its operative range by the suction of the motor.

11. In a hydrocarbon motor, the combination with a carburetor having a spring closed valve, of a solenoid coil mounted above the valve, and a device adapted to partially open the valve when the solenoid is energized, said valve being actuated through the remainder of its operative range by the suction of the motor.

12. In a hydrocarbon motor, the combination with a carburetor for supplying mixture thereto, said carburetor having a spring operated air valve, and a generator operated by the motor, of a solenoid supported on the carburetor above said air valve and having a plunger adapted to contact with said air valve, connection from said generator to said solenoid so that the latter is energized at a predetermined speed of the generator whereby the solenoid is energized and the plunger actuates the air valve.

13. In a hydrocarbon motor, the combination with the motor intake pipe and the throttle valve, of mixture forming and supplying means connected to said intake pipe, said means comprising a fuel supply chamber, a feed nozzle connected thereto, and air supply means, and including automatic means for controlling the quality of the mixture, said controlling means comprising means for producing a rich mixture when the motor is idling, means controlled by the speed of the motor for producing a lean mixture for cruising range speed, and means controlled by the suction of the motor for securing a rich mixture when the throttle valve is wide open.

14. A device of the class described comprising, in combination with a hydrocarbon motor having an intake pipe and a throttle valve, a fuel supply reservoir, a feed nozzle in communication with said reservoir, an air supply passage for supplying air to the fuel passing through said nozzle, a valve in said air passage, resilient means maintaining said air valve closed when said throttle valve is nearly closed as for idling, and means for opening said valve a predetermined amount when said motor operates at a speed within the cruising range, the tension of said resilient means being less than the suction in said intake pipe when said motor operates at a speed in excess of the highest cruising range speed.

15. A device of the class described comprising, in combination with a hydrocarbon motor having an intake pipe and a throttle valve, a fuel supply reservoir, a feed nozzle in communication with said reservoir, air supply passages for supplying air to the fuel passing through said nozzle, a valve in one of said passages for controlling the amount of air supplied therethrough, and means for opening said valve when the motor operates at a speed within the cruising range, said valve being adapted to be opened a greater amount by the suction in said intake pipe when the motor operates at a speed in excess of the highest cruising range speed.

16. The method of controlling the supply of a combustible mixture for an internal combustion engine provided with a throttle valve which consists in supplying a rich mixture for idling, suddenly supplying a lean mixture at a predetermined engine speed, supplying a lean mixture throughout the cruising range speeds, and supplying a rich mixture for full open throttle running.

17. The method of supplying a combustible mixture to internal combustion engines which consists in supplying a rich mixture for idling, suddenly increasing the relative volume of air supplied when a predetermined lowest cruising range speed is reached maintaining the relative volume of air supplied throughout the cruising range speeds, and supplying a rich mixture for full open throttle running.

18. In a hydrocarbon motor, the combination with means including an auxiliary air intake for supplying a combustible mixture of fuel and air to the motor, of a movable valve for controlling the flow of air through said intake, said valve being adapted to be actuated by the suction of the motor when the latter reaches a speed greater than the highest cruising range speed, resilient actuating means for said valve the tension of said resilient means being less than the suction through said intake at speeds greater than cruising range speed, and means including a plunger for positively moving said valve.

19. A device of the class described comprising, in combination with an internal combustion engine having an intake pipe and a throttle valve therein, a fuel reservoir for supplying fuel to said pipe, a feed nozzle in communication with said reservoir, air supply passages for supplying air to the fuel passing through said nozzle, a valve in one of said passages for controlling the amount of air supplied therethrough, said valve being adapted to be actuated by suction, and means for positively actuating said valve at cruising range speed.

20. An internal combustion engine, in combination with a mixture forming and supplying means therefor, an auxiliary air intake, a valve for controlling the amount of air passing through said intake, means for effectively maintaining said valve in closed position at idling speeds of the motor, and means for rendering said first named means ineffective when a predetermined lowest cruising range speed is reached, said valve being thereafter actuated by suction.

21. In combination, a hydrocarbon motor having an intake pipe and a throttle valve, mixture forming and supplying means connected to said pipe, said means including a main air intake, and means for varying the volume of air supplied to said pipe including an auxiliary air intake in communication with said pipe, a movable valve for controlling said auxiliary intake, mechanism including a plunger for opening said valve at the lowest cruising range speed, and resilient means having operative engagement with said valve for resisting movement of said valve and plunger, said valve being adapted to be opened a further amount by suction after the valve has been opened by said plunger.

In testimony whereof I affix my signature.

LIONEL M. WOOLSON.